United States Patent
Mueller

(10) Patent No.: US 12,522,499 B2
(45) Date of Patent: Jan. 13, 2026

(54) METHOD AND DEVICE FOR ASCERTAINING DYNAMIC PARAMETERS OF A MEMS APPARATUS, AND MEMS APPARATUS

(71) Applicant: Robert Bosch GmbH, Stuttgart (DE)

(72) Inventor: Juergen Mueller, Ofterdingen (DE)

(73) Assignee: Robert Bosch GmbH, Stuttgart (DE)

(\*) Notice: Subject to any disclaimer, the term of this patent is extended or adjusted under 35 U.S.C. 154(b) by 306 days.

(21) Appl. No.: 18/553,008

(22) PCT Filed: Oct. 5, 2022

(86) PCT No.: PCT/EP2022/077672
§ 371 (c)(1),
(2) Date: Sep. 28, 2023

(87) PCT Pub. No.: WO2023/078623
PCT Pub. Date: May 11, 2023

(65) Prior Publication Data
US 2024/0166500 A1    May 23, 2024

(30) Foreign Application Priority Data
Nov. 2, 2021 (DE) ...................... 10 2021 212 327.9

(51) Int. Cl.
*B81C 99/00* (2010.01)
(52) U.S. Cl.
CPC .................. *B81C 99/003* (2013.01)
(58) Field of Classification Search
CPC .................................................. B81C 99/003
(Continued)

(56) References Cited

U.S. PATENT DOCUMENTS

2014/0083164 A1\* 3/2014 Homeijer .............. B81C 99/003
73/1.82
2020/0386781 A1\* 12/2020 Hegger ................... G01P 15/08

FOREIGN PATENT DOCUMENTS

DE     102014200512 B4    6/2017
DE     102021202132 A1    9/2021
(Continued)

OTHER PUBLICATIONS

International Search Report for PCT/EP2022/077672, Issued Jan. 26, 2023.
(Continued)

*Primary Examiner* — Walter L Lindsay, Jr.
*Assistant Examiner* — Philip T Fadul
(74) *Attorney, Agent, or Firm* — Norton Rose Fulbright US LLP

(57) ABSTRACT

A method for ascertaining at least one dynamic parameter of a MEMS apparatus, which has at least one movable component, and the at least one dynamic parameter describes a dynamic property of the at least one movable component. A test signal which has at least one static excitation of constant amplitude is applied to the MEMS apparatus, and a response signal of the MEMS apparatus to the test signal is detected. At least one static parameter of the MEMS apparatus is ascertained by evaluating the response signal in respect of the at least one static excitation, using a model of at least the movable component of the MEMS apparatus, the at least one static parameter describing a geometric and/or structural property of the at least one movable component. The at least one dynamic parameter of the MEMS apparatus is calculated based on the ascertained at least one static parameter.

10 Claims, 3 Drawing Sheets

(58) Field of Classification Search
USPC .......................................................... 73/1.01
See application file for complete search history.

(56) References Cited

FOREIGN PATENT DOCUMENTS

| JP | H0830461 | B2 | 3/1996 |
| JP | 2800561 | B2 | 9/1998 |
| JP | 2006078435 | A | 3/2006 |
| JP | 2009139172 | A | 6/2009 |
| JP | 4287987 | B2 | 7/2009 |
| JP | 2010048598 | A | 3/2010 |
| JP | 4712474 | B2 | 6/2011 |
| JP | 5121301 | B2 | 1/2013 |
| JP | 2014122858 | A | 7/2014 |
| JP | 6130493 | B2 | 5/2017 |
| JP | 2019040702 | A | 3/2019 |
| JP | 7037967 | B2 | 3/2022 |
| JP | 7224105 | B2 | 2/2023 |
| JP | 7587994 | B2 | 11/2024 |
| WO | 2007125756 | A1 | 11/2007 |
| WO | 2013002809 | A1 | 1/2013 |

OTHER PUBLICATIONS

Heringhaus et al., "Transfer Learning for Test Time Reduction of Parameter Extraction in MEMS Accelerometers," Journal of Microelectromechanical Systems, IEEE, vol. 30, No. 3, 2021, pp. 401-410. <https://sci-hub.ru/10.1109/jmems.2021.3065975> Downloaded Sep. 27, 2023.

Bhat et al., "Parameter Extraction From Simple Electrical Measurements on Surface Micromachined Cantilevers," J. Micro/Nanolith. MEMS MOEMS, vol. 6, No. 4, 2007, pp. 043013-1 to 043013-7.

\* cited by examiner

METHOD AND DEVICE FOR ASCERTAINING DYNAMIC PARAMETERS OF A MEMS APPARATUS, AND MEMS APPARATUS

FIELD

The present invention relates to a method and device for ascertaining dynamic parameters of a micro electromechanical (MEMS) apparatus. The present invention further relates to a MEMS apparatus.

BACKGROUND INFORMATION

MEMS systems can be used to measure accelerations, rotational rates, magnetic fields, pressures, and the like. An exemplary pressure sensor apparatus is described in German Patent Application No. DE 10 2014 200 512 B4. Such systems can comprise mechanical or electronic components which can be dynamically, in particular periodically excited. The frequency characteristics of these components are among the most important device properties. For example, a PT2 system can be characterized by the resonance frequency $f_0$ and the damping constant d, or by Lehr's damping coefficient $D_L$.

As these are dynamic properties, they are typically determined by dynamic tests. For example, a sinusoidal, or more generally a periodic, test signal can be applied to the device and the response of the device can be ascertained in amplitude or phase for two or more frequency test points. Another option for determining the dynamic properties can be by recording and analyzing the turn-on or turn-off transients, wherein the dynamic properties can be simultaneously extracted by regression and fitting.

These methods are susceptible to errors due to the high time resolution (i.e., short averaging times). Further, highly over-damped systems do not exhibit meaningful frequency behavior and are therefore difficult to evaluate. Moreover, over-damped systems in particular are difficult to dynamically excite.

Beyond this, if strong excitation stimuli are needed, these excitations may alter the natural frequencies and damping values due to feedback mechanisms of the test apparatus acting on the sensor structure. For example, the stiffness of spring elements may decrease.

Another challenge is that frequency and damping have poor mutual mathematical conditioning, especially under critical circumstances (such as over-damping). When the test data are noisy, extraction of these parameters is therefore difficult at best.

With special equipment and using laboratory test equipment, improved measurement results can be achieved by applying large stimuli to elaborately prepared chips, for example. However, under more common production or field conditions using already integrated components, this is hardly possible. Likewise, calibration steps for autonomous modules are still barely feasible.

SUMMARY

The present invention provides a method and device for ascertaining dynamic parameters of a MEMS apparatus, as well as a MEMS apparatus.

Preferred embodiments of the present invention are disclosed herein.

According to a first aspect, the present invention accordingly relates to a method for ascertaining at least one dynamic parameter of a MEMS apparatus, wherein the MEMS apparatus comprises at least one movable component, and wherein the at least one dynamic parameter describes a dynamic property of the at least one movable component. A test signal is applied to the MEMS apparatus, the test signal having at least one static excitation of constant amplitude, and a response signal of the MEMS apparatus to the test signal is detected. At least one static parameter of the MEMS apparatus is ascertained by evaluating the response signal in respect of the at least one static excitation, using a model of at least the movable component of the MEMS apparatus, the at least one static parameter describing a geometric and/or structural property of the at least one movable component. The at least one dynamic parameter of the MEMS apparatus is calculated on the basis of the ascertained at least one static parameter.

According to a second aspect, the present invention relates to a device for ascertaining at least one dynamic parameter of a MEMS apparatus, wherein the MEMS apparatus comprises at least one movable component, and wherein the at least one dynamic parameter describes a dynamic property of the at least one movable component. The device comprises a testing device configured to apply a test signal to the MEMS apparatus, wherein the test signal has at least one static excitation of constant amplitude, and wherein the testing device is further configured to receive a signal from the MEMS apparatus in response to the test signal. The MEMS apparatus further comprises an evaluation device configured to ascertain at least one static parameter of the MEMS apparatus by evaluating the response signal in respect of the at least one static excitation using a model of at least the movable component of the MEMS apparatus, the at least one static parameter describing a geometric and/or structural property of the at least one movable component. The evaluation device is further configured to calculate the at least one dynamic parameter of the MEMS apparatus on the basis of the ascertained at least one static parameter.

According to a third aspect, the present invention relates to a MEMS apparatus having at least one movable component and a device according to the present invention for ascertaining at least one dynamic parameter of the MEMS apparatus.

The present invention makes it possible to fully determine the dynamic behavior of the MEMS apparatus within the context of a chosen model. In so doing, at least one dynamic parameter is determined using a non-dynamic method, which enormously simplifies the determination of the dynamic properties experimentally and through instruments. The facilitation is made possible by compensatingly incorporating a correspondingly complex and valid mathematical model of at least the movable component of the MEMS apparatus.

The present invention is particularly advantageous for over-damped systems with limited excitability and a poor dynamic signal-to-noise ratio. Furthermore, the present invention is also suitable for highly integrated components with restricted access for high frequency (HF) analysis. Such a high level of integration is expected in future sensor devices, wherein, for example, ASIC (application specific integrated circuit) read-out electronics can be directly integrated. Thus, it is not possible to access the MEMS apparatus itself and characterize dynamic parameters.

The present invention thus allows dynamic properties to continue to be characterized very precisely even in the case of high component integration. A complex integration of correspondingly bulky HF analysis resources into the silicon substrate of the read-out electronics can be avoided.

Static measurements are typically taken after manufacture, so that there is no additional time spent. The measurement may be performed in preferably only a few milliseconds.

The method is particularly suitable for performing dynamic high-level characterizations on autonomous edge devices. Splitting up the dynamic characterization into a simpler static characterization and a dynamic supplemental characterization significantly reduces the amount of instrument integration. The compensating measures, for example an arithmetic unit and a memory, can be done very cost-effectively due to the availability of microcontrollers and digital signal processors, and they are already included as standard in current MEMS apparatuses.

The implementation only requires options for simplified static actuation, for example using test voltages which are usually also standard. The static signal recording and preparation may generally be carried out by the signal processing of an ASIC circuit, which typically already exists.

In order to perform the dynamic part of the measurement, only a limited measurement infrastructure is needed, since a substantial portion of the complexity is covered by the static measurements and model equations. According to one embodiment, a FIFO (first in-first out) memory is provided for recording a one-time short time transient.

In particular, the geometric properties make it possible to calculate important performance properties of the MEMS apparatus. For example, the spring constant can be ascertained using the beam formula and the mass can be ascertained using the volume and density. The resonance frequency can be ascertained using the spring constant and mass. Knowledge of geometric variables, such as lengths and heights of structural elements, or electrical doping, makes calculating performance variables such as bandwidth or power consumption possible.

According to a further embodiment of the method of the present invention for ascertaining the at least one dynamic parameter of the MEMS apparatus, the test signal comprises a plurality of static excitations of constant amplitude, wherein furthermore at least one further dynamic parameter of the MEMS apparatus is ascertained by evaluating the response signal in respect of a transient behavior between two static excitations. However, the dynamic measurements can be reduced by the static tests and evaluation using the model.

According to another embodiment of the method of the present invention for ascertaining the at least one dynamic parameter of the MEMS apparatus, calculating the at least one dynamic parameter comprises ascertaining a mass of the movable component of the MEMS apparatus, ascertaining a spring constant of the movable component of the MEMS apparatus, and calculating a natural frequency of the movable component as a dynamic parameter of the MEMS apparatus using the mass and the spring constant. The natural frequency only depends on the mass and the spring constant.

According to another embodiment of the method of the present invention for ascertaining the at least one dynamic parameter of the MEMS apparatus, the model of at least the movable component of the MEMS apparatus comprises a refined structural-mechanical description, in particular a finite element model.

According to a further embodiment of the method of the present invention for ascertaining the at least one dynamic parameter of the MEMS apparatus, the ascertaining of the at least one static parameter is performed using at least one force balance equation. This force balance equation describes the condition of the static behavior.

According to a further embodiment of the method of the present invention for ascertaining the at least one dynamic parameter of the MEMS apparatus, the at least one static parameter comprises a geometric structural property of the movable component of the MEMS apparatus, in particular a structure width of the movable component of the MEMS apparatus and/or a structure height of the movable component of the MEMS apparatus.

According to a further embodiment of the method of the present invention for ascertaining the at least one dynamic parameter of the MEMS apparatus, the at least one further dynamic parameter comprises a damping number of the movable component of the MEMS apparatus.

According to another embodiment of the method of the present invention for ascertaining the at least one dynamic parameter of the MEMS apparatus, the movable component is modeled as a PT2 system, i.e., a spring-mass damping system, and the at least one dynamic parameter comprises a resonance frequency of the movable component and/or a damping coefficient of the movable component. The PT2 system is defined by these two dynamic parameters. For example, the resonance frequency of the movable component can be determined separately from a purely static excitation. The advantage of this is that static experiments are far less prone to noise and error influences compared to dynamic tests. Further dynamic parameters can then be isolated and precisely determined using a dynamic characterization technique based on the model, for example, in a PT2 description, the second dynamic parameter, i.e. in this case the damping variable, since relevant dynamic variables have already been defined in advance by precise static tests and are held constant in the actual dynamic experiment. Particular advantages arise when (as with over-damped systems) the variables to be determined in the dynamic experiment are in poor conditioning with respect to one another.

With this approach, poor mathematical conditioning of the two frequency parameters is circumvented and the noisy and sensitive dynamic test data are only used to determine a better-manageable subset of the dynamic parameters.

However, the present invention is not limited to PT2 systems. Thus, the model of the at least one movable component of the MEMS apparatus can include corrections beyond the simple PT2 description, i.e., dynamic descriptions of higher complexity.

According to another embodiment of the method of the present invention for ascertaining the at least one dynamic parameter of the MEMS apparatus, drift detection, leakage detection, or the like can be performed based on the ascertained dynamic parameters. In particular, due to the simple hardware requirements, the test methods can also be performed on an autonomous device using a microcontroller in the field.

According to a further embodiment of the device of the present invention for ascertaining the at least one dynamic parameter of the MEMS apparatus, the test signal comprises a plurality of static excitations of constant amplitude, wherein the evaluation device is further configured to ascertain at least one further dynamic parameter of the MEMS apparatus by evaluating the response signal in respect of a transient behavior between two static excitations. If a plurality of excitation stages are available, either the error in determining the at least one parameter can be reduced—or further design parameters can be determined using the available larger amount of information.

Further advantages, features and details of the present invention arise from the following description, in which various exemplary embodiments are described in detail with reference to the figures.

The numbering of the method steps is used for reasons of clarity and is generally not intended to imply any particular temporal order. It is in particular also possible to perform multiple method steps simultaneously.

DETAILED DESCRIPTION OF EXAMPLE EMBODIMENTS

Figure 1:
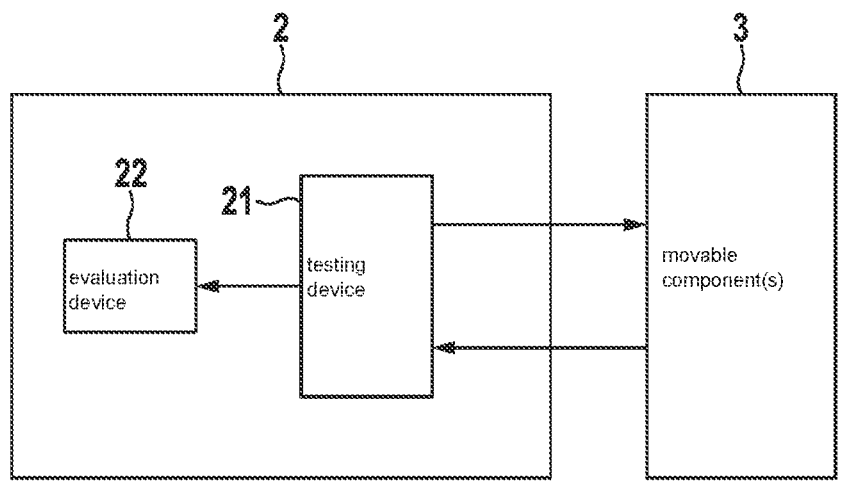
FIG. 1 shows a schematic block diagram of a MEMS apparatus having a device for ascertaining at least one dynamic parameter of the MEMS apparatus according to one embodiment of the present invention.

FIG. 1 shows a schematic block diagram of a MEMS apparatus 1 having a device 2 for ascertaining at least one dynamic parameter of the MEMS apparatus 1. The MEMS apparatus 1 comprises one or more movable components 3, such as an oscillating element (for example a micro-mirror) or a deflectable and oscillatable electrode. The MEMS apparatus 1 may be a pressure sensor, density sensor, accelerometer, rotation rate sensor, or the like. The at least one dynamic parameter characterizes a dynamic property of the at least one movable component. For example, the dynamic parameter may comprise the natural frequency of the movable component 3 of the MEMS apparatus 1.

The device 2 for ascertaining the at least one dynamic parameter of the MEMS apparatus 1 comprises a testing device 21 which generates a test signal and applies it to the MEMS apparatus 1. For example, the test signal may be stepped. The test signal has at least one static excitation of constant amplitude. For example, in a stepped progression, each step corresponds to a static excitation. The testing device 21 is further configured to receive a response signal of the MEMS apparatus 1 to the test signal, the response signal depending on the deflection of the movable component 3.

Further, the MEMS apparatus 1 comprises an evaluation device 22, which comprises a computing unit, for example a microprocessor, a microcontroller, or the like.

The evaluation device 22 is configured to ascertain at least one static parameter of the MEMS apparatus 1 by evaluating the response signal in respect of the at least one static excitation. In the process, the evaluation device 22 uses a model which models the MEMS apparatus 1 or at least models the movable component 3 of the MEMS apparatus 1. For example, the model may be a finite element model, a system of differential equations, or a machine learning model.

The at least one static parameter relates to a geometric and/or structural property of the at least one movable component 3. In particular, the static parameter may comprise a structure width of the movable component 3 of the MEMS apparatus 1 and/or a structure height of the movable component 3 of the MEMS apparatus 1.

The evaluation device 22 is further configured to calculate the at least one dynamic parameter of the MEMS apparatus 1 using the ascertained at least one static parameter.

Figure 2:
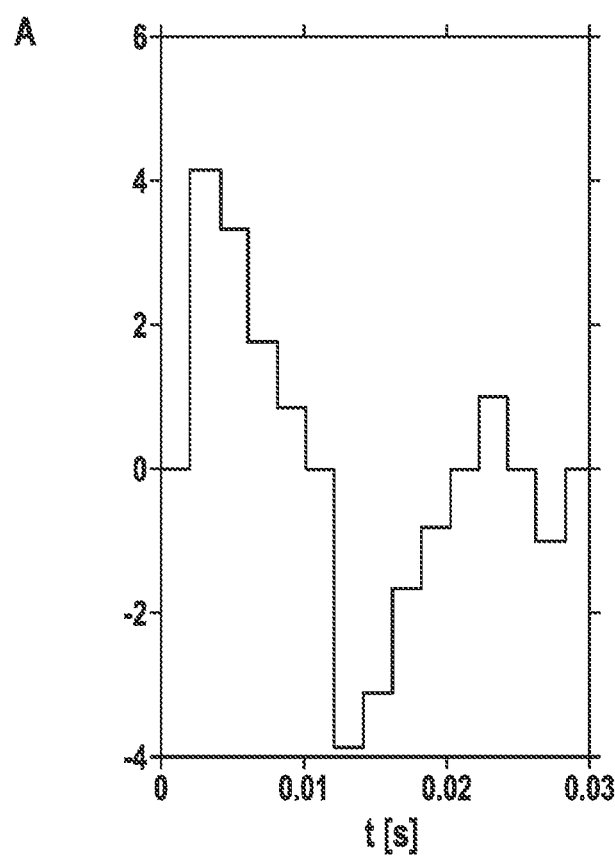
FIG. 2 shows an exemplary test signal for applying to the MEMS apparatus.

FIG. 2 shows an exemplary test signal for applying to the MEMS apparatus 1 as a function of time t. The test signal may describe an excitation by way of electric voltage or acceleration stimuli, for example. Here, the test signal has a stepped progression. During each step, the movable component 3 is excited at constant amplitude A. The amplitudes A of different steps are preferably different. In particular, partial signals with amplitudes A of different signs may be applied. Optionally, it may be provided to test the MEMS apparatus 1, i.e., to apply the static excitation of constant amplitude A, in different spatial orientations for at least some steps.

The measured values at constant excitation in the steps correspond to the static experiment to be evaluated for determining the at least one statically determined dynamic parameter.

The time-dependent measurement points in the transient from one static level to the next can be used in the second step to calculate the at least one further dynamic parameter.

Figure 3:
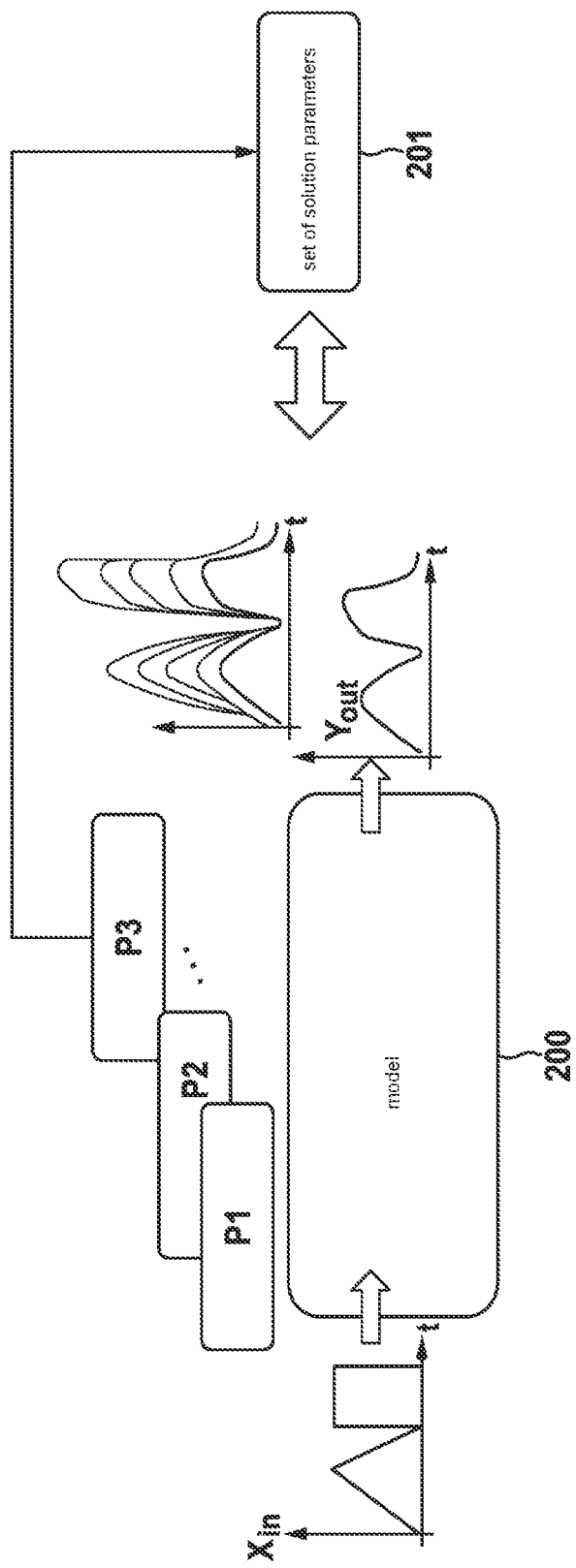
FIG. 3 shows an exemplary flow diagram for explaining the determination of the dynamic parameter of the MEMS apparatus.

FIG. 3 shows an exemplary flow diagram for explaining the determination of the dynamic parameter of the MEMS apparatus 1. In this case, a test signal X_in is applied to the MEMS apparatus 1, the signal being triangular in a first time period and rectangular in a second time period, i.e., it has a static excitation of constant amplitude. The triangular signal (or also a transition area between rectangular signals) allows the determination of the remaining dynamic parameters since a transient behavior of the movable component 3 is ascertained.

A model 200 provides a dynamic system description, i.e., an equation $$dY/dt = f(Y, F\_ext)$$

where F_ext describes external forces (such as gravitation), Y denotes the system state, and f denotes a function dependent on the system.

For a plurality of static measurements, intrinsic structural parameters s_1, ..., s_n of the MEMS apparatus 1 may be determined. For example, force equilibrium equations may be used that depend on the structural parameters via model equations or the model description f of the MEMS apparatus 1. Static behavior corresponds to the condition $$dY/dt = f(s\_1, \ldots, s\_n) = 0.$$

At least some of the structural parameters s_1, ..., s_n can be determined from this.

The missing information content for determining a dynamic variable from static parameters is thus provided by including the design equations of the movable component, i.e., using the model. For example, the spring constant of flexible beams can be ascertained from the geometric dimensions together with the formulas of structural mechanics.

Static testing can ascertain static structural properties, for example a thickness of the movable components and mass values by evaluating static force equilibrium equations or by testing for free geometric adjustment ranges.

For example, the design equations may be used to calculate the spring constants and mass values of the subcomponents for a PT2 system, for example from geometrical or structural data, as well as variables derivable therefrom. For example, the resonance frequency f_0 follows from known relations such as:

$$f_0(\text{dynamic}) = \frac{1}{2\pi}\sqrt{\frac{k(\text{struct} = \text{static})}{m(\text{struct} = \text{static})}}$$

Here, the resonance frequency f_0 is a dynamic variable, whereas the spring constant k or the mass m may be ascertained using static measurements.

When the resonance frequency f0 is known, further dynamic parameters (damping D_L, for example) may be ascertained using dynamic regression. For this purpose, parameter sets such as P1, P2, . . . , P3 illustrated in FIG. 3 are examined until the calculated progression corresponds as well as possible to the measured progression Y_out. This determines the set of solution parameters 201.

For over-damped systems, the two free parameters of resonance frequency f0 and damping D_L have a poor mathematical relationship. However, the resonance frequency f0 is already known from the static measurements and design equations. It is thus possible to break the poor mathematical conditioning of the two parameters. If the resonance frequency f0 is known, only the damping D_L remains to be determined from the dynamic measurement. This provides both parameters with excellent accuracy.

The approach is not limited to simple PT2 dynamics, but can also be extended to dynamic systems of higher complexity.

Ideally, all relevant parameters can be ascertained by static measurements. A number of other performance or calibration parameters of the MEMS apparatus 1 can then be derived from the design equations—for example offset, sensitivity or linearity of the components and systems of the MEMS apparatus 1.

Generally, N independent error-free static measured variables may be ascertained, from which a maximum of N structural parameters of the movable component 3 can be determined. Each measured variable corresponds to a determination relation, i.e., a mathematical equation. Measurements are usually compromised by noise in the test data. This reduces the accuracy in determining the structural variables to be calculated. The calculation error can be reduced by increasing the number of test values to M>N. This corresponds in the mathematical representation to an over-determined system of equations for which an optimizing solution can be determined by regression.

Figure 4:
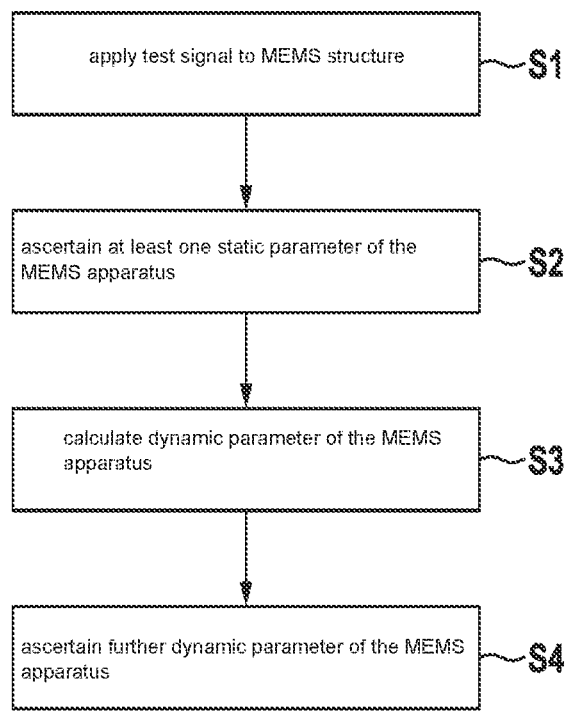
FIG. 4 shows a flow diagram of a method for ascertaining at least one dynamic parameter of the MEMS apparatus according to an example embodiment of the present invention.

FIG. 4 shows a flow diagram of a method for ascertaining at least one dynamic parameter of the MEMS apparatus 1. The MEMS apparatus 1 comprises at least one movable component 3. In particular, it may be a MEMS apparatus 1 described above. The at least one dynamic parameter describes a dynamic property of the at least one movable component 3.

In a first method step S1, a test signal with a predefined shape is applied to the MEMS apparatus, wherein the test signal comprises at least one static excitation of constant amplitude. The test signal may also have multiple steps. A response signal of the MEMS apparatus 1 to the test signal is detected.

In a second method step S2, at least one static parameter of the MEMS apparatus 1 is ascertained by evaluating the response signal in respect of the at least one static excitation using a model of at least the movable component 3 of the MEMS apparatus 1. The at least one static parameter describes a geometric and/or structural property of the at least one movable component.

The at least one dynamic parameter of the MEMS apparatus is calculated in a third method step S3 using the ascertained at least one static parameter.

In a further method step S4, at least one further dynamic parameter of the MEMS apparatus 1 may be ascertained by evaluating the response signal in respect of a transient behavior between two static excitations.

For example, as described above, a spring constant of the movable component 3 of the MEMS apparatus 1 may be determined and subsequently a natural frequency of the movable component 3 may be calculated as a dynamic parameter of the MEMS apparatus 1 on the basis of the mass and the spring constant.

The invention claimed is:

1. A method for ascertaining at least one dynamic parameter of a microelectromechanical (MEMS) apparatus, the MEMS apparatus having at least one movable component, and wherein the at least one dynamic parameter describes a dynamic property of the at least one movable component, the method comprising the following steps:
    applying a test signal to the MEMS apparatus, the test signal having at least one static excitation of constant amplitude, and detecting a response signal of the MEMS apparatus to the test signal;
    ascertaining at least one static parameter of the MEMS apparatus by evaluating the response signal in respect of the at least one static excitation using a model of at least the movable component of the MEMS apparatus, the at least one static parameter describing a geometric and/or structural property of the at least one movable component; and
    calculating the at least one dynamic parameter of the MEMS apparatus using the ascertained at least one static parameter.

2. The method according to claim 1, wherein the test signal includes a plurality of constant amplitude static excitations, and wherein at least one further dynamic parameter of the MEMS apparatus is ascertained by evaluating the response signal in respect of a transient behavior between two static excitations.

3. The method according to claim 2, wherein the at least one further dynamic parameter includes a damping coefficient of the movable component of the MEMS apparatus.

4. The method according to claim 1, wherein the calculating the at least one dynamic parameter includes ascertaining a mass of the movable component of the MEMS apparatus, ascertaining a spring constant of the movable component of the MEMS apparatus, and calculating a natural frequency of the movable component as a dynamic parameter of the MEMS apparatus based on the mass and the spring constant.

5. The method according to claim 1, wherein the model of at least the movable component of the MEMS apparatus includes a refined structural-mechanical description.

6. The method according to claim 1, wherein the ascertaining of the at least one static parameter is performed using at least one force balance equation.

7. The method according to claim 1, wherein the at least one static parameter includes a geometric structural property of the movable component of the MEMS apparatus.

8. A device for ascertaining at least one dynamic parameter of a microelectromechanical (MEMS) apparatus, the MEMS apparatus including at least one movable component, and wherein the at least one dynamic parameter describes a dynamic property of the at least one movable component, the device comprising:
- a testing device configured to apply a test signal to the MEMS apparatus, the test signal having at least one static excitation of constant amplitude, and wherein the testing device is further configured to receive a response signal of the MEMS apparatus to the test signal; and
- an evaluation device configured to ascertain at least one static parameter of the MEMS apparatus by evaluating the response signal in respect of the at least one static excitation, using a model of at least the movable component of the MEMS apparatus, wherein the at least one static parameter describes a geometric and/or structural property of the at least one movable component, wherein the evaluation device is further configured to calculate the at least one dynamic parameter of the MEMS apparatus based on the ascertained at least one static parameter.

9. The device according to claim 8, wherein the test signal includes a plurality of static excitations of constant amplitude, and wherein the evaluation device is further configured to ascertain at least one further dynamic parameter of the MEMS apparatus by evaluating the response signal in respect of a transient behavior between two static excitations.

10. A system comprising:
- a microelectromechanical (MEMS) apparatus having at least one movable component; and
- a device for ascertaining at least one dynamic parameter of the MEMS apparatus, wherein the at least one dynamic parameter describes a dynamic property of the at least one movable component, the device including:
  - a testing device configured to apply a test signal to the MEMS apparatus, the test signal having at least one static excitation of constant amplitude, and wherein the testing device is further configured to receive a response signal of the MEMS apparatus to the test signal; and
  - an evaluation device configured to ascertain at least one static parameter of the MEMS apparatus by evaluating the response signal in respect of the at least one static excitation, using a model of at least the movable component of the MEMS apparatus, wherein the at least one static parameter describes a geometric and/or structural property of the at least one movable component, wherein the evaluation device is further configured to calculate the at least one dynamic parameter of the MEMS apparatus based on the ascertained at least one static parameter.

* * * * *